(12) United States Patent
Balfour et al.

(10) Patent No.: US 8,820,698 B2
(45) Date of Patent: Sep. 2, 2014

(54) BREAK-AWAY HOOK ASSEMBLY

(71) Applicant: Electric Motion Company, Inc., Winsted, CT (US)

(72) Inventors: William J. Balfour, Winsted, CT (US); John Auclair, Norfolk, CT (US); Anthony Salvador Delmonico, Austin, TX (US)

(73) Assignee: Electric Motion Company, Inc., Winsted, CT (US)

( * ) Notice: Subject to any disclaimer, the term of this patent is extended or adjusted under 35 U.S.C. 154(b) by 0 days.

(21) Appl. No.: 14/049,307

(22) Filed: Oct. 9, 2013

(65) Prior Publication Data

US 2014/0034378 A1 Feb. 6, 2014

Related U.S. Application Data

(62) Division of application No. 13/170,266, filed on Jun. 28, 2011, now Pat. No. 8,556,223.

(60) Provisional application No. 61/359,044, filed on Jun. 28, 2010.

(51) Int. Cl.
*F16M 13/00* (2006.01)
*H02G 7/04* (2006.01)
*H02G 7/05* (2006.01)

(52) U.S. Cl.
CPC ............... *H02G 7/04* (2013.01); *H02G 7/056* (2013.01); *Y10S 248/909* (2013.01)

USPC ............... 248/548; 248/909; 170/40 R; 403/2

(58) Field of Classification Search
CPC .......... H02G 7/04; H02G 7/056; H02G 7/053
USPC ....... 248/548, 909, 900; 403/2; 174/40 R, 44; 52/148

See application file for complete search history.

(56) References Cited

U.S. PATENT DOCUMENTS

| | | | | |
|---|---|---|---|---|
| 3,049,194 | A * | 8/1962 | Brendel | 52/1 |
| 3,601,862 | A * | 8/1971 | Hargadon | 24/343 |
| 4,016,796 | A * | 4/1977 | Brannan | 89/1.806 |
| 4,040,359 | A * | 8/1977 | Blajda et al. | 102/527 |
| 4,117,256 | A * | 9/1978 | Williams | 174/40 R |
| 5,357,656 | A * | 10/1994 | Trowbridge | 24/370 |
| 5,529,276 | A * | 6/1996 | Szablya | 248/548 |
| 6,078,008 | A * | 6/2000 | Wood et al. | 174/44 |
| 6,245,991 | B1 * | 6/2001 | Ryan | 174/40 TD |
| 6,382,583 | B1 * | 5/2002 | Hill et al. | 248/548 |
| 7,077,612 | B1 * | 7/2006 | Diggle et al. | 411/400 |
| 2014/0041926 | A1 * | 2/2014 | McGuire et al. | 174/40 TD |

* cited by examiner

*Primary Examiner* — Amy Sterling
(74) *Attorney, Agent, or Firm* — Alix, Yale & Ristas, LLP

(57) ABSTRACT

A break-away hook assembly is adapted for installation for use with a low-voltage residential communication cable. A pair of members is coupled. One of the members has a connector with a terminal portion which receives a terminus of the other member. The connector breaks to release the second member from coupled engagement with the first member so that upon application of a stress in excess of a pre-established load, the cable will sag while maintaining the communication integrity of the cable.

4 Claims, 6 Drawing Sheets

BREAK-AWAY HOOK ASSEMBLY

CROSS-REFERENCE TO RELATED APPLICATION

This application is a divisional of U.S. patent application Ser. No. 13/170,266, filed Jun. 28, 2011, which claims the priority of U.S. Provisional Patent Application No. 61/359,044 filed on Jun. 28, 2010, the disclosure of which is incorporated herein in its entirety.

BACKGROUND

This disclosure relates generally to hooks which are employed to suspend communication and/or data cables for residential applications. More particularly, this disclosure relates generally to hooks with a threaded end which connect with the exterior of the residence and retain an overhead cable to provide remote communication with the residence.

For conventional cable installations to which the present disclosure relates, it is common practice to connect a low voltage data communication cable, which may be a fiber optic cable, a telephone line or other conventional cable, between a remote carrier line and the residential structure to provide communication to the interior of the residence. P-hooks, bridle rings or other similar hardware include a threaded end which threads into the upper exterior structure of the residence. The hardware includes a catch which receives the cable closely adjacent the residence to provide an overhead suspension point. A trailing end portion of the cable is fixedly secured to the residence exterior. The cable ultimately connects at the residence interior for communication purposes with the telephone, computer, TV or other electronic device.

Such communication cables typically carry a very low current and ordinarily do not pose a danger of electrical shock or adverse consequences if they are accidentally grasped or fall on or contact an individual.

During severe weather conditions, such as high winds, ice storms, hail and other adverse conditions, it is common for overhead communication cables under extreme loads to collapse until a break-point is surpassed or fall to the ground, break apart and thereby interrupt communication through the cable. It is necessary for utility service providers to visit the location of the downed cables and replace cables and/or restore the cables to the proper suspended and connected positions. When the conditions are wide-spread and result in multitudinous outages, it can take an unacceptably long time for a utility to restore cable communication service.

Even though the downed cables ordinarily do not present a significant hazard to individuals, the downed cables are problematic due to the fact that communication is typically interrupted until proper service and connections are restored.

SUMMARY

Briefly stated, a break-away hook assembly for a low voltage residential communication cable in a preferred form comprises a first member and a second member. The first member comprises a threaded segment and a shank segment extending from the threaded segment. A bent portion defines a generally curvilinear catch with a terminus that extends adjacent an intermediate portion of the shank segment and is generally spaced therefrom to form an entry for the catch.

The second member is coupled to the first member for engagement with a catch. The second member comprises a connector with a terminal portion defining an opening dimensioned to receive the terminus of the first shank. A shank segment extends from the connector and a bent portion comprising a compound bend defines a second curvilinear catch with a terminus that extends adjacent the shank segment and is generally spaced therefrom to form an entry for the second catch. The terminal portion breaks to release the second member from coupled engagement with the first member upon application of a stress applied to the second catch in excess of a pre-established load.

The break-away hook assembly in one embodiment employs a first member with a P-hook. The connector is preferably manufactured from a fusible glass composite. The second member, in one embodiment, comprises a portion which is substantially identical to the first member with the second threaded segment potted in the connector.

A communication cable installation for residential or similar structure comprises a first P-hook threaded into an elevated location of the structure and forming a first catch. A second P-hook has a second catch and is attached to a connector with an opening. The first P-hook is coupled through the opening and engaged by the first catch. The communication cable is connected to the second catch for suspension at an overhead location. When a load above a pre-established threshold is applied to the cable, the connector breaks to uncouple the second P-hook from the first P-hook, thereby allowing the communication cable to sag.

DETAILED DESCRIPTION

Figure 1:
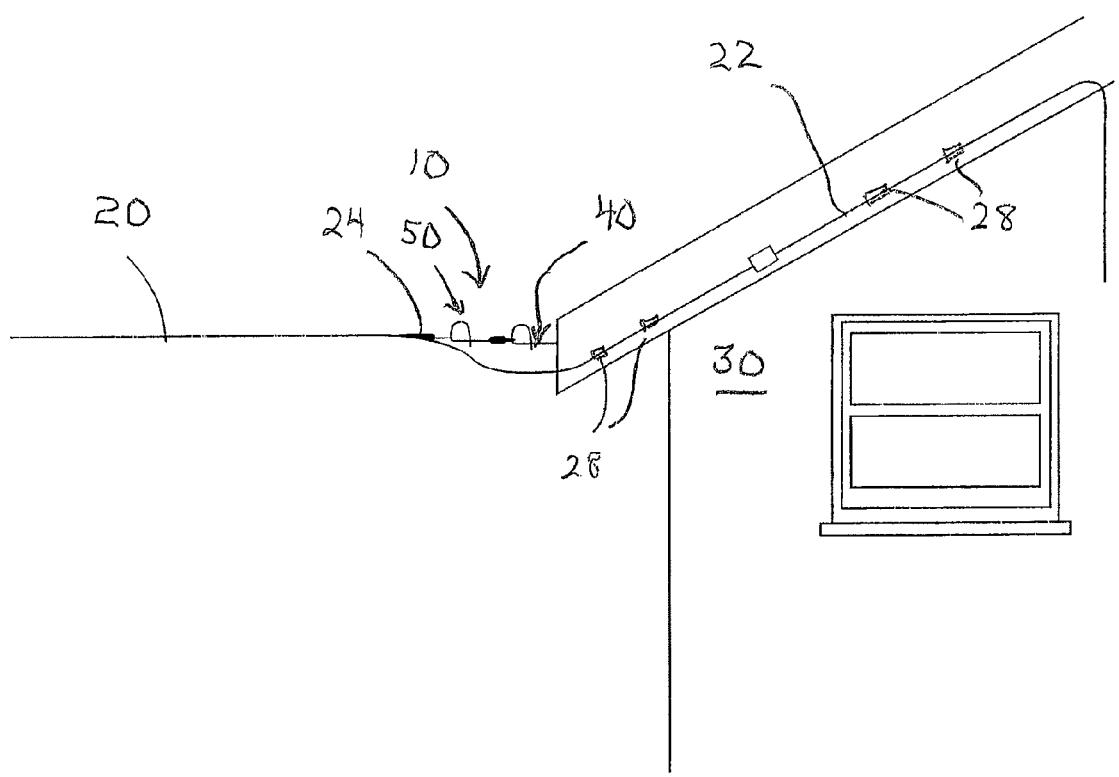
FIG. 1 is a side elevational view of a break-away hook assembly installed at a residence to provide overhead cable communication with the residence.

With reference to the drawings wherein like numerals represent like parts throughout the several Figures, a break-away hook assembly is generally designated by the numeral 10. The hook assembly 10 is especially adapted for use in connection with suspending an overhead communication cable 20 from the upper portions of a residential structure 30.

The hook assembly 10 functions to provide a suspension point for the overhead cable under normal conditions. However, in the event that the cable 20 should be subject to excessive stress or loading, the hook assembly 10 breaks apart to provide a relief sag condition for the cable so as to minimize communication disruption through the cable. The controlled relief sag provided by the break-away hook assembly consequently allows the service providers of the utility additional time to fully restore the cable sagging and to efficiently restore the cable suspension.

The communication cable 20 is a low current cable such as a fiber optic cable, a telephone line or other communication cable which provides communication between a remote carrier line or trunk (not illustrated) and the interior of the residence. The leading portion 22 of the cable may be fixedly attached to the exterior of the residence. The terminal end of the cable is connected at the interior of the structure to provide the communication with electronic equipment such as, for example, a telephone, a computer, a television or other electronic device. Typically, a suspender or drop wire clamp 24 may be fastened to the cable 20 to facilitate the overhead suspension.

The break-away hook assembly 10 is comprised of two cooperative components, namely, hook 40 and hook/connector 50 which efficiently couple to form the break-away hook assembly. Hook 40 may assume various forms, but is preferably a hook which is commonly referred to a P-hook or a bridle hook. Such a hook is typically characterized by a threaded end 42, a shank 44 and an opposed compound bended portion 46 forming a catch, wherein the distal end 48 is spaced away from the shank to form an entry 49 to the catch. The threaded end 42 is typically adapted to thread into the wood trim portions of the residence structure. The entry 49 typically provides access to the catch which may be employed to suspend the cable or to receive a suspender or drop wire clamp 24 which ties off or connects with the cable. A bridle ring (not illustrated), which may also be used for a similar application, typically has a more circular geometry, but also has a threaded end and an entry.

Figure 2:
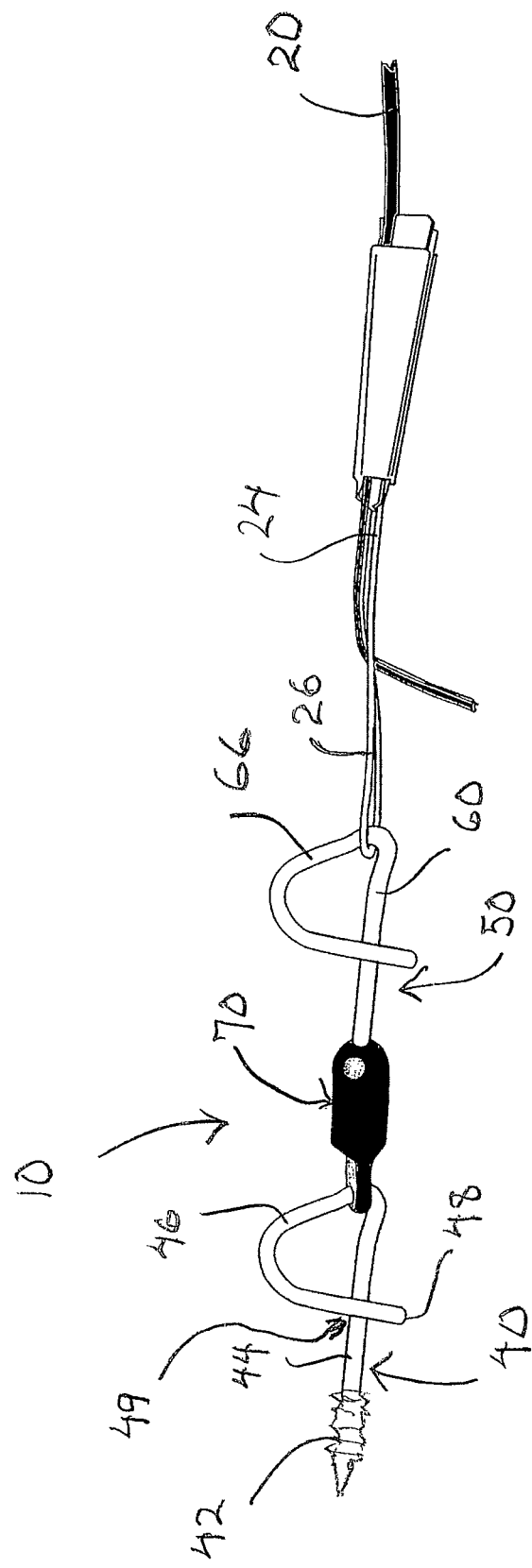
FIG. 2 is an enlarged view, taken from the opposite side thereof, of the break-away hook assembly and a portion of the cable and a suspender of FIG. 1.
Figure 2A:
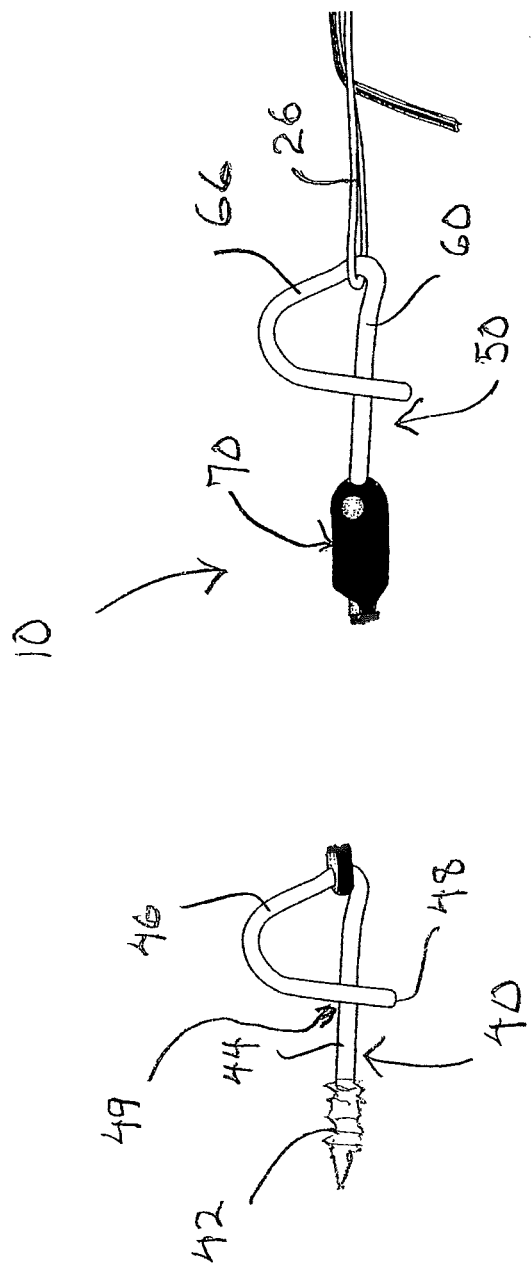
FIG. 2A shows the break-away hook assembly of FIG. 2 after stress in excess of a pre-established load is applied to the second catch.
Figure 3:
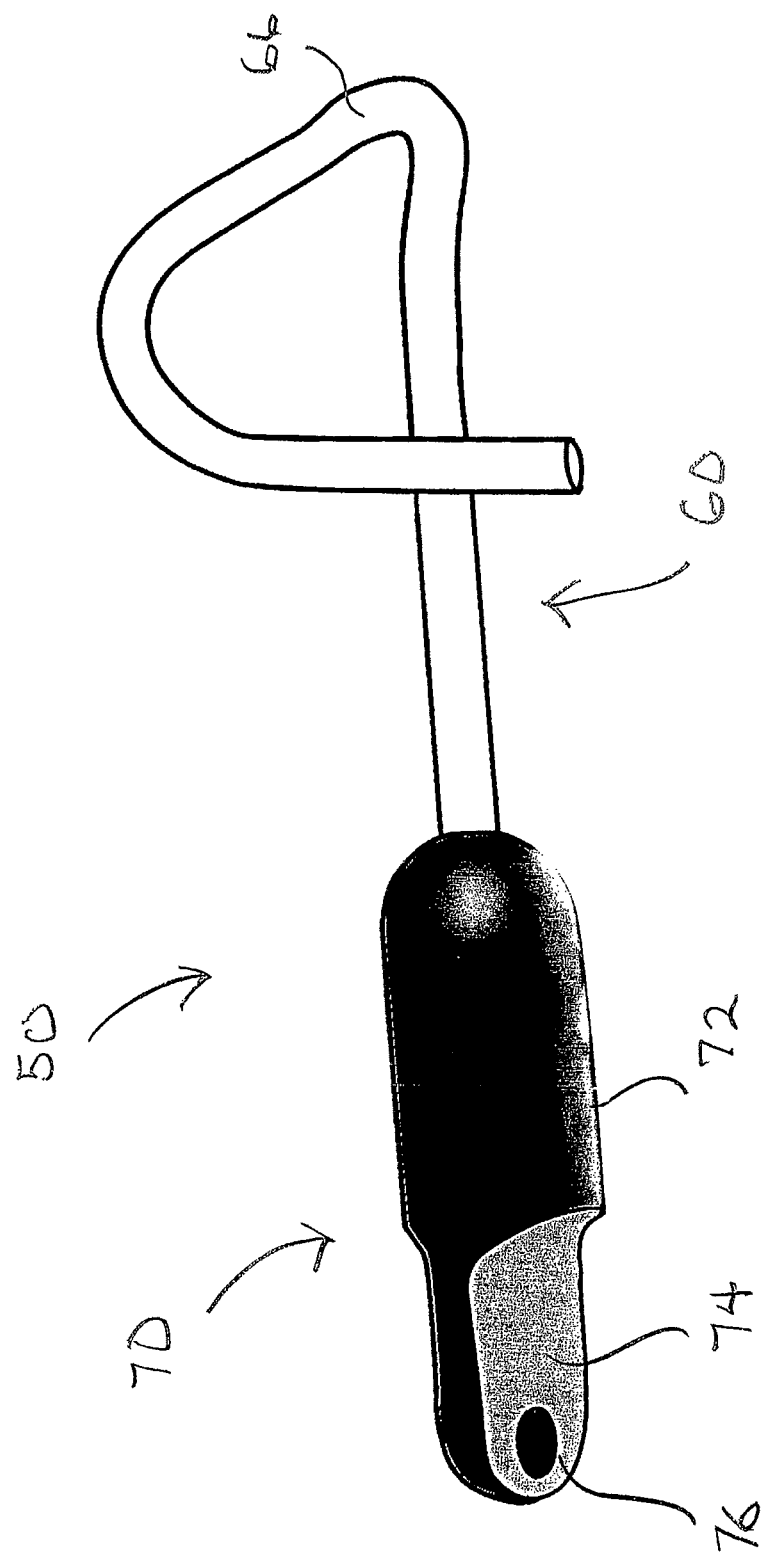
FIG. 3 is an enlarged perspective view of one component of the break-away hook assembly of FIG. 1.
Figure 4:
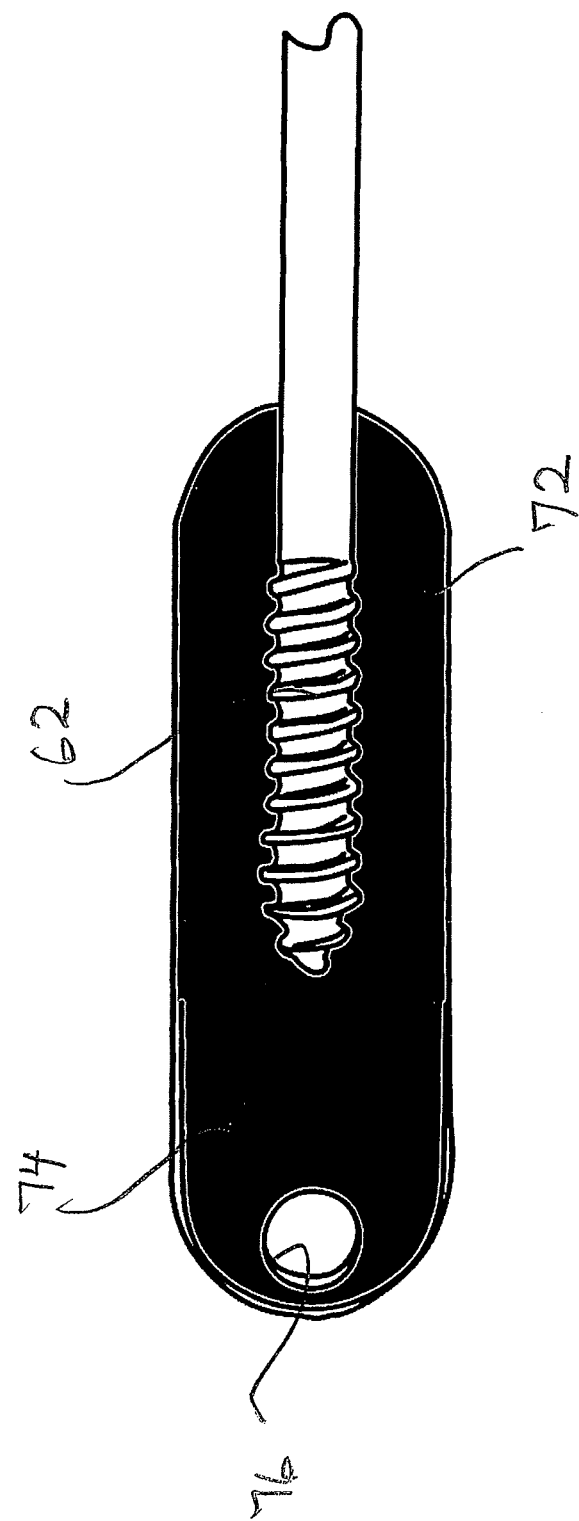
FIG. 4 is an enlarged fragmentary side view, portions removed, of the component of FIG. 3.
Figure 5:
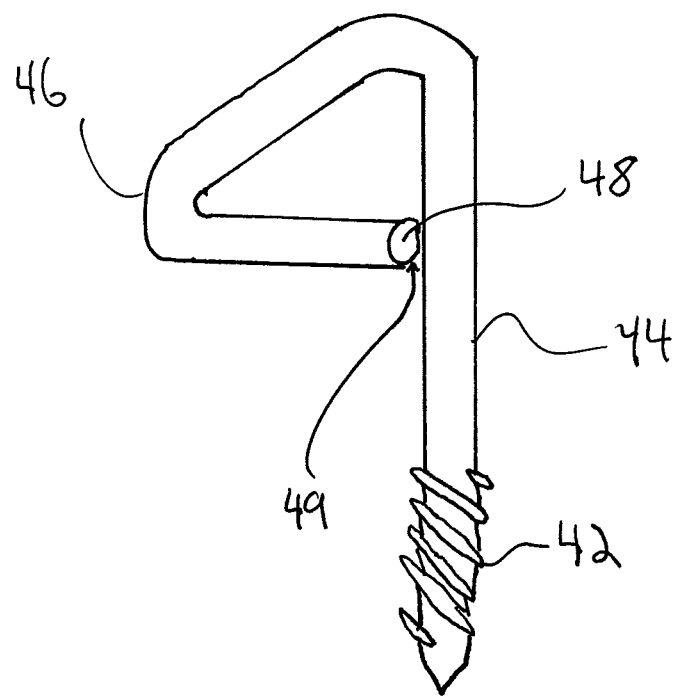
FIG. 5 is a bottom-plan view of the first connector of FIG. 2, the second connector being substantially identical.

With additional reference to FIGS. 3 and 4, hook/connector 50 preferably includes a P-hook 60 substantially similar in form and function to P-hook 40 as well as an end connector 70. The threaded end 62 of the P-hook is potted in the end connector 70 which may preferably be manufactured from glass filled nylon or other plastic. The connector 70 has an enlarged portion 72 surrounding the threaded end 62 of the P-hook 60. The extreme end of the connector has a reduced portion 74 which includes a central opening 76. The opening 76 is dimensioned to allow the connector to pass over the end 48 of the hook 40 and be received in the catch as best illustrated in FIG. 2. Preferably, the connector 70 is formed from any fusible material which is selected to have a pre-established break point. Other materials having a pre-established break point characteristic are also possible.

The hook assembly 10 is assembled as illustrated in FIG. 2, wherein the hook/connector 50 couples to hook 40 which is anchored to the residence structure. A suspender or drop wire clamp 24 which connects with the cable 20 has a loop 26 received in the catch 66 of hook 50. The hook assembly 10 is essentially installed in a semi-taut configuration for suspending the cable in an overhead functional position. The leading portion 20 of the cable is then fixedly attached by connectors 28 which may be plastic or otherwise adapted to break away under a heavy load from their anchoring position against the structure of the residence.

Under normal conditions, hook assembly 10 functions to suspend the cable 20 in a proper overhead position. However, the hook assembly 10 is adapted to break away under a load above a pre-established threshold (beyond the range of normal conditions) so that the communication cable will essentially dangle or sag above the ground and allow communication to be transmitted across the cable even under severe loading conditions such as may occur in high winds or under icy conditions. The reduced portion 74 of the connector 70 is constructed so that it will essentially break away at the opening 76, thereby disengaging from the catch 46. The disengagement allows the cable to sag, without severing the cable or communication connections. In some conditions, the cable may have sufficient length so that it pulls the remaining trailing portions of the cable from the structure so that the cable lies across the ground or other objects, but nevertheless, continues to provide communication.

The proper position of the cable for overhead suspension can be relatively easily restored by the service provider visiting the site and replacing and mounting the hook/connector 50.

One embodiment of a hook assembly 10 as described was tested under simulated load conditions. A communication cable was suspended at an overhead location and oriented substantially as shown in FIG. 1. A tensile pull force was applied to the communication cable. The cable was subjected to a gradually increasing torsional motion until a load threshold was reached. The reduced connector portion 76 was eventually severed so that the first hook 40 disengaged from its connection with hook/connector 50 and the cable sagged below its previously anchored position while maintaining the cable integrity of the communication function.

The invention claimed is:

1. A communication cable installation for a residential or similar structure comprising:
    a first P-hook threaded into an elevated location of said structure and forming a first catch;
    a second P-hook having a second catch and attached to a connector with an opening, said first P-hook coupled through said opening and engaged by said first catch;
    a communication cable connected to said second catch for suspension at an overhead location,
    wherein when a load above a pre-established threshold is applied to said cable, said connector breaks to uncouple said second P-hook from said first P-hook, thereby allowing said communication cable to sag.

2. The communication cable installation of claim 1 wherein said connector is manufactured from a fusible glass composite.

3. The communication cable installation of claim 1 wherein said second member comprises a portion substantially identical to said first member with a second threaded segment potted in said connector.

4. The communication cable installation of claim 1 wherein said cable connects to said catch by means of a loop connecting said cable.

* * * * *